May 20, 1924.  
G. P. HAYNES ET AL  
STRAINER FOR OIL AND OTHER LIQUIDS  
Filed Dec. 29, 1920   4 Sheets-Sheet 1
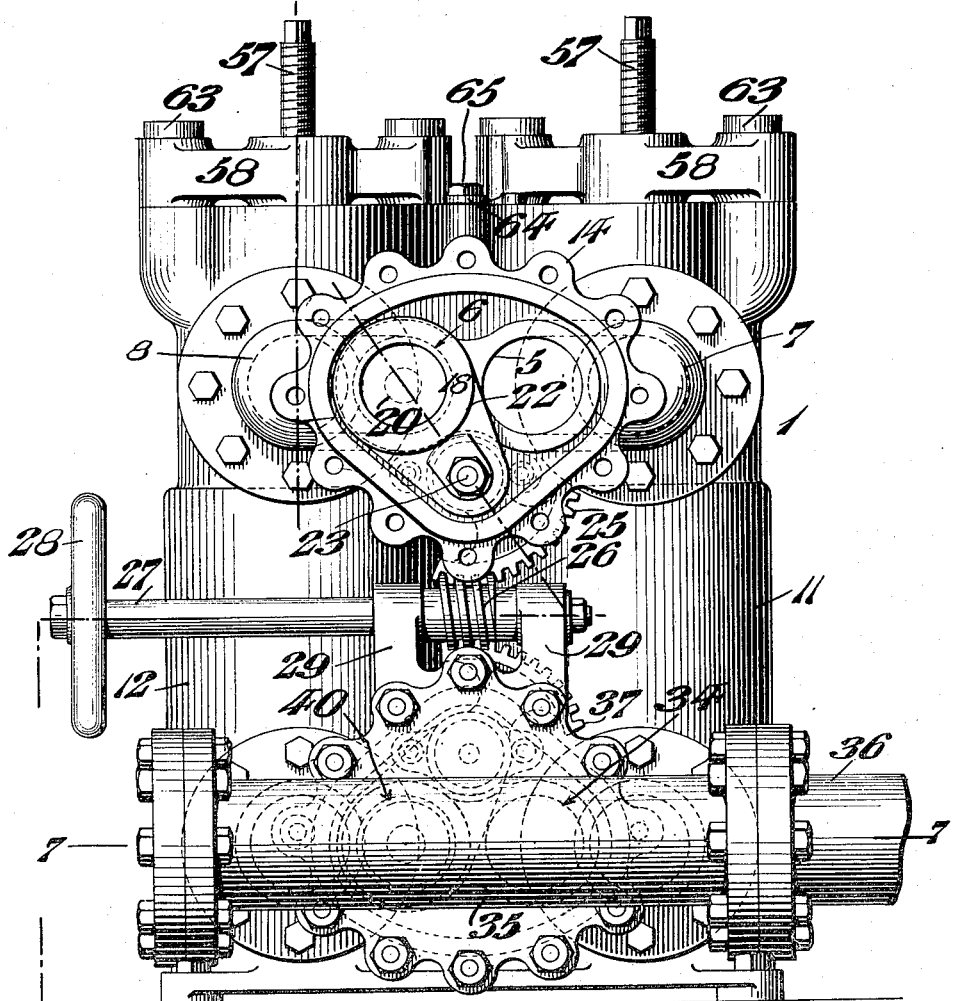

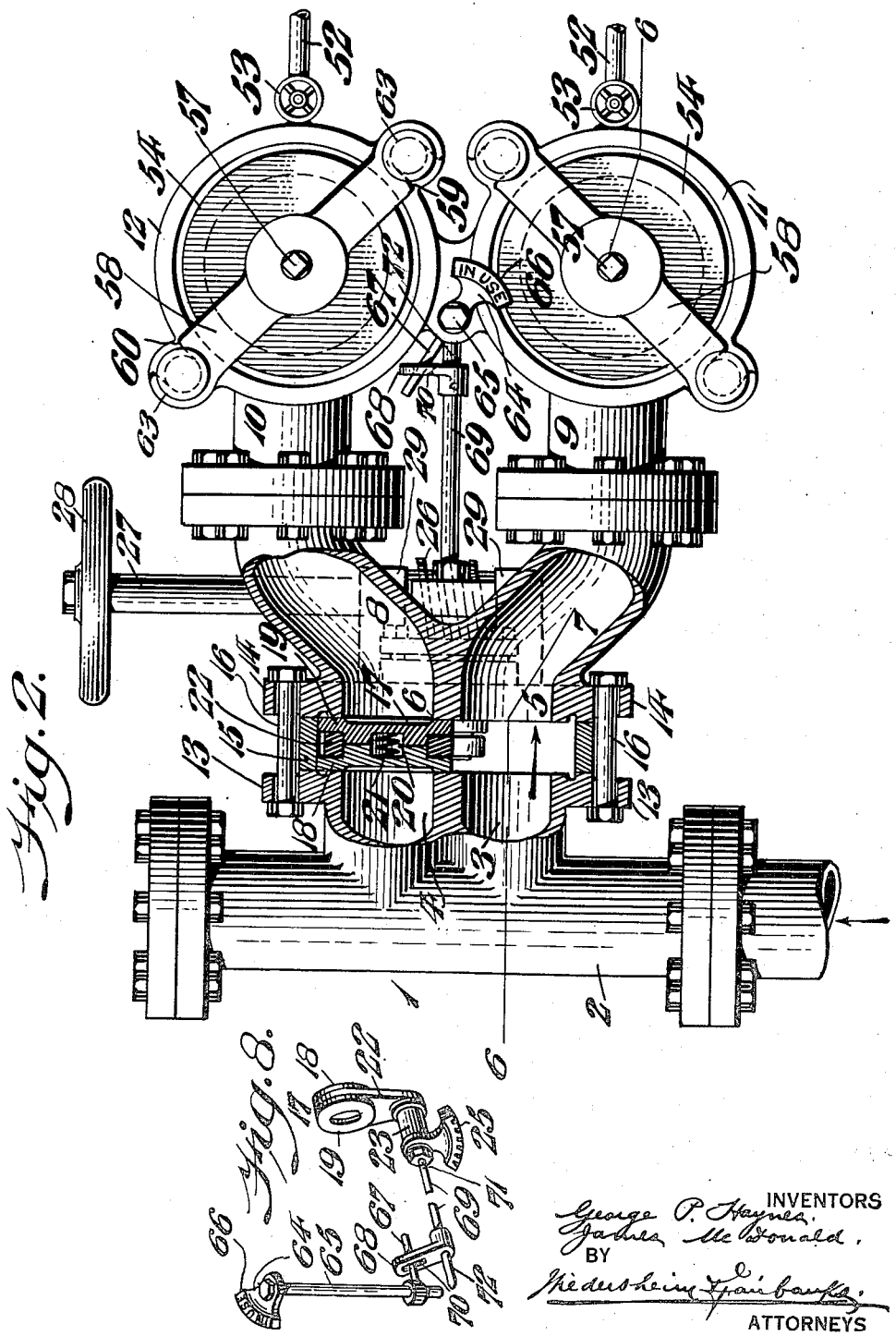

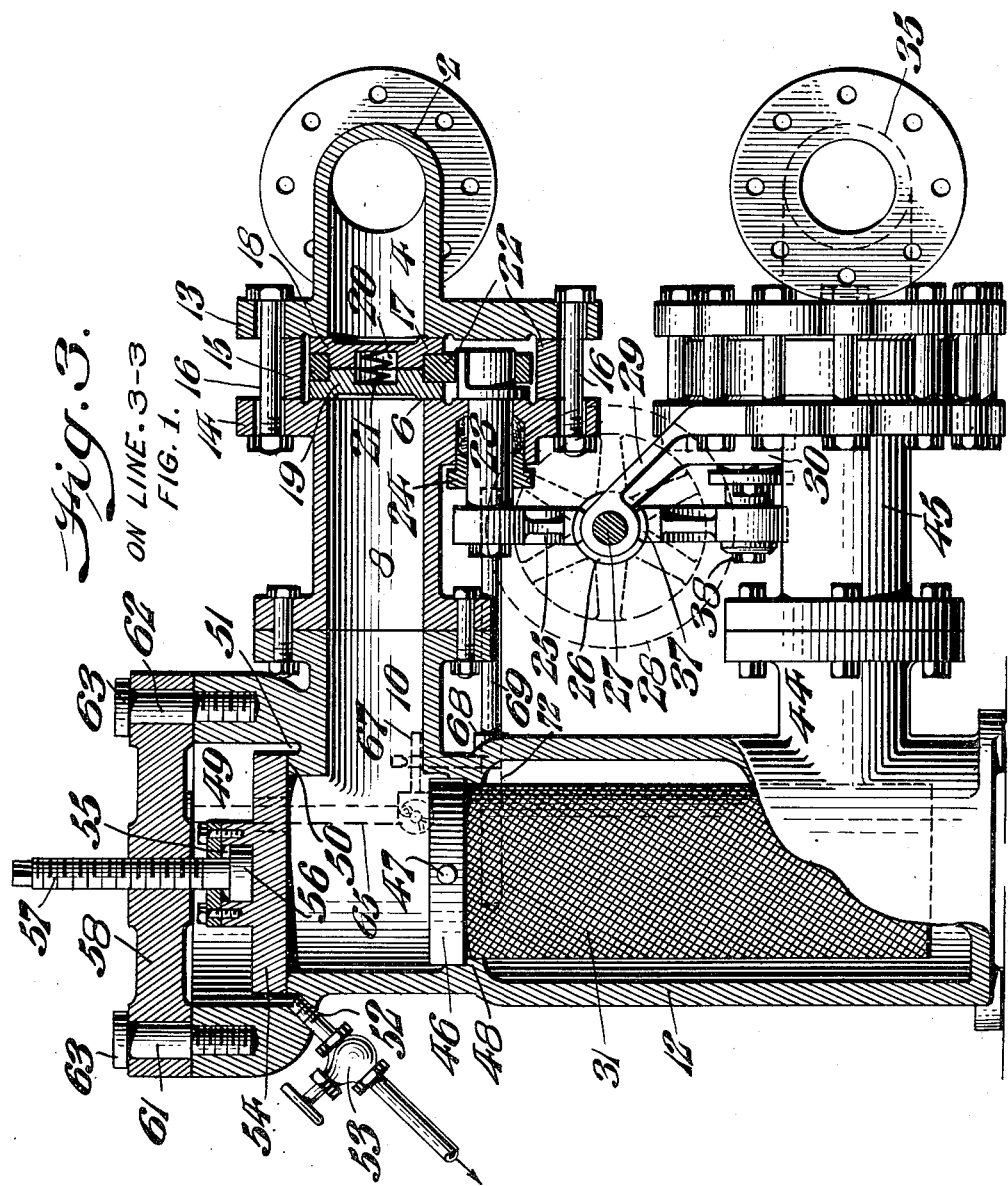

May 20, 1924.
G. P. HAYNES ET AL
1,494,836
STRAINER FOR OIL AND OTHER LIQUIDS
Filed Dec. 29, 1920   4 Sheets-Sheet 4
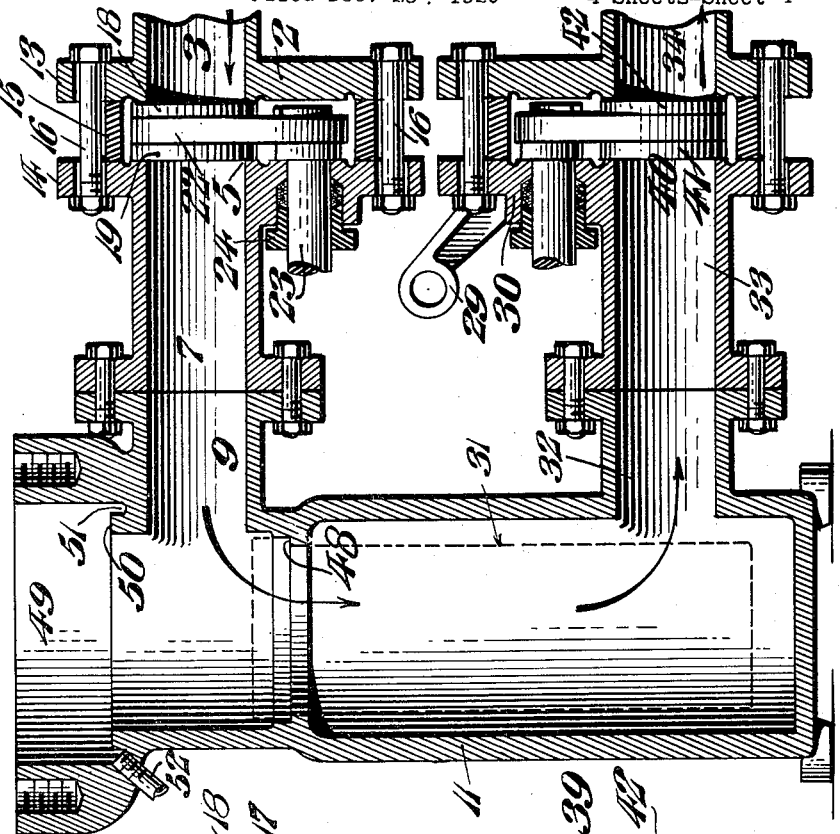
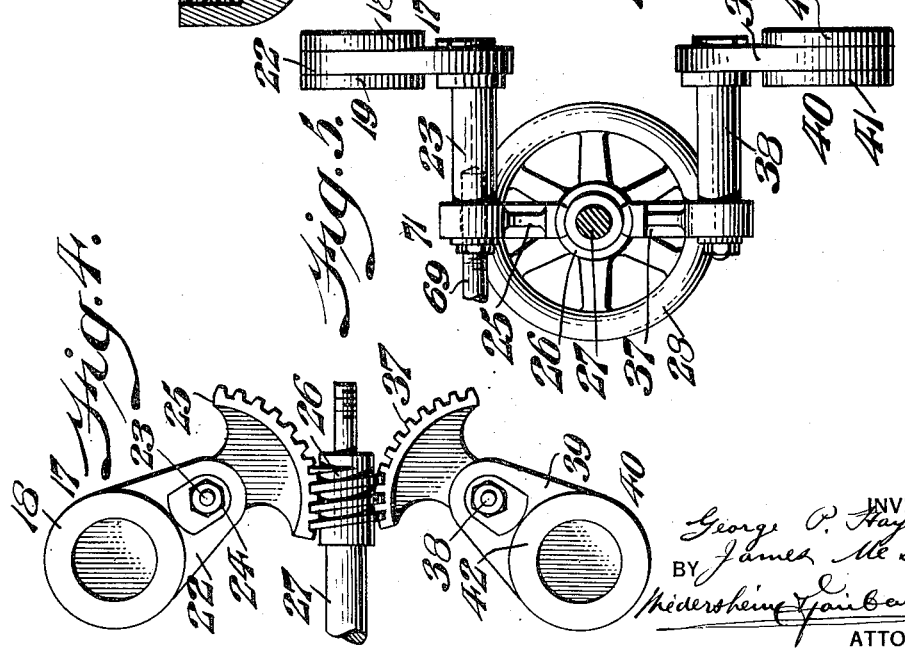
INVENTORS
George P. Haynes.
James McDonald.
BY
ATTORNEYS Patented May 20, 1924.

1,494,836

UNITED STATES PATENT OFFICE.

GEORGE P. HAYNES, OF BROOKLYN, NEW YORK, AND JAMES McDONALD, OF WEEHAWKEN, NEW JERSEY.

STRAINER FOR OIL AND OTHER LIQUIDS.

Application filed December 29, 1920. Serial No. 433,834.

*To all whom it may concern:*

Be it known that we, GEORGE P. HAYNES, a citizen of the United States, residing at Brooklyn, in the county of Kings, State of New York, and JAMES McDONALD, a citizen of the United States, residing in the town of Weehawken, Hudson County, State of New Jersey, have invented a new and useful Strainer for Oil and Other Liquids, of which the following is the specification.

Our invention consists of a novel construction of a strainer for oil and other liquids which is adapted to fuel oil pipe lines for marine and other uses wherein we employ an upper inlet manifold having a plurality of valve controlled inlet openings and a lower outlet manifold having a plurality of valve controlled outlet openings, said manifolds being attached by suitable connections to upper and lower portions of the strainer body proper, which is made in duplicate and provided with two preferably upright members, each of which contain the straining elements or strainer baskets, the organization being such that either side of the apparatus may be rendered temporarily operative or inoperative at will, both sides of the device being provided with means for facilitating access to the desired strainer which may be temporarily inoperative and for enabling the inoperative strainer to be readily inspected, replaced or drained according to requirements.

Our invention further consists in a novel construction of upper and lower inlet and outlet control valves, which are each provided with operating mechanism having upper and lower quadrants respectively, which are engaged or actuated by a worm common thereto and mounted on a spindle provided with an operating wheel, so that the upper inlet control valve and the lower outlet control valve are simultaneously or synchronously actuated in the desired direction, according to requirements.

It further consists of a novel construction of a closure or lower plate and clamping means therefor, located in proximity to both the strainer elements, whereby access can be readily had to the interior of the desired strainer chamber and strainer.

It further consists of a novel construction of connections common to the inlet manifold and the branches leading to the upper portion of the strainer, whereby a valve chamber is formed for a novel construction of inlet control valve.

It further consists of a novel construction of a lower outlet manifold and connections leading thereto from the bottom of each strainer, whereby a novel construction of outlet control valve chamber is formed.

It further consists of a novel manner of mounting, supporting and actuating the upper inlet control valve and the lower outlet control valve.

It further consists of a novel construction of indicating device, which is actuated in the proper direction upon the rotation of the hand wheel, which actuates the control valves, and automatically indicates which side of the apparatus is in use and which side is temporarily inoperative or out of use, thereby enabling the attendant to readily ascertain which strainer or basket should be elevated for removal or inspection.

It further consists of a novel means for giving access to a desired strainer basket and in the provision of a novel cup-shaped chamber which prevents the liquid slopping over the strainer when the cover is removed and the operator starts to elevate the strainer or basket, means being provided for enabling the liquid, which has heretofore been permitted to slop over and be wasted, to be readily drained and the waste recovered.

Our invention further consists of novel means for positively causing one side or the other of the strainer to be in service at all times, it being impossible to shut the strainer off completely, which is a very advantageous feature in marine use where the strainer is located on an oil line supplying the boiler furnaces since this feature obviates all possibility of a careless operator putting out the fires by closing the strainer valves incorrectly.

It further consists of other novel features of construction and advantage, all as will be hereinafter fully set forth and pointed out in the claims.

For the purpose of illustrating our invention, we have shown in the accompanying drawings forms thereof which are at present preferred by us, since they will give in practice satisfactory and reliable results, although it is to be understood that the various instrumentalities of which our invention consists can be variously arranged and organized and that our invention is not limited to the precise arrangement and organization of these instrumentalities as herein shown and described.

Figure 1 represents a front elevation of a novel construction of a strainer for oil and other liquids, embodying our invention, the upper inlet manifold being removed for the purpose of showing the construction and location of the upper pair of inlet ports and the inlet control valve common to both of said ports, said valve being shown as closing the left hand inlet port.

Figure 2 represents a plan view of Figure 1 certain of the parts being shown in section and the inlet control valve being shown as closing the left-hand inlet to the device.

Figure 3 represents a section on line 3—3 of Figure 1, certain of the parts being shown in elevation and the inlet controlling valve being shown as controlling the left-hand inlet to the strainer.

Figure 4 represents a diagrammatic view showing the worm common to the upper and lower operating post quadrants showing also the control lever arms for the upper inlet control valve and the lower outlet control valve.

Figure 5 represents a side elevation of Figure 4 showing the operating worm spindle in section and showing the relative position of the quadrant operating worm to the quadrants and the inlet and outlet valves and their adjuncts.

Figure 6 represents a section on line 6—6 of Figure 2 showing the course of the liquid through the right-hand side of the apparatus, when the left hand inlet and outlet ports are closed as seen in Figures 1 and 2.

Figure 7 represents a section on line 7—7 of Figure 1 showing the internal construction of the lower outlet manifold.

Figure 8 represents in detached position, a perspective view of the indicator and its operating mechanism.

Similar numerals of reference indicate corresponding parts in the figures.

Referring to the drawings:—

1 designates my novel construction of strainer and its adjuncts, the same comprising the upper inlet manifold 2, which is removed from Figure 1, but shown in Figures 2, 3 and 6 and which has the right hand outlet passage 3 and the left hand outlet passage 4, said passages being adapted to discharge, respectively into the right and left hand ports 5 and 6 respectively of the right and left hand inlet branches 7 and 8, which discharge into the right and left hand sections 9 and 10 respectively, which communicate with the right and left hand strainer chambers 11 and 12 respectively. The upper inlet manifold 2 can be variously assembled with respect to the inlet branches 7 and 8, see Figure 2, but we preferably employ the flanges 13 on the inlet manifold which are secured to the flanges 14 of the Y shaped member and we interpose between said flanges the spacing or distance ring 15, which parts are held in assembled position by the bolts or other fastening devices 16. By the above construction a valve chamber is formed for the upper valvular member inlet or control valve 17, composed of the control valve discs 18 and 19, which are provided with the inner central juxtaposed recesses, forming a pocket 20 for the coil or other spring 21, whose tension serves to press said discs outwardly against their respective seats. The control valve 17 is actuated from right to left or vice versa to control the ports 5 and 6 by means of the control valve lever arm 22 which is fixedly mounted on and actuated by the control valve operating post 23, which is packed by the stuffing box gland 24, (see Figures 3 and 6) and to the outer end of said operating post 23 is secured by a nut or the like the operating post quadrant 25, which is in mesh with the worm 26, mounted on the worm operating spindle or shaft 27 the latter being mounted in bearings in the lugs 29, which may be cast on the outlet control valve body 30 (as seen in Figures 3 and 6). It will consequently be seen from the foregoing, that the upper inlet manifold 2 is provided with a plurality of discharge or inlet openings, 3 and 4 which are controlled by the inlet control valve 17, the latter, when in the position seen in Figures 1 and 2, and 3 closing off the left hand inlet 4 and causing the oil or other liquid to flow through the right hand passages, 3, 5, 7 and 9 to the right hand strainer chamber 11, as will be understood from Figure 6, thence through the strainer or basket 31 therein to the outlet 32, thence through the outlet 33 to the right hand branch 34 of the lower outlet manifold 35 to the exit 36, see Figure 7. The upper inlet manifold 2 shown in Figure 2 but removed from Figure 1, is substantially the same as the lower outlet manifold 35, and the construction and arrangement of the valves and the valvular operating mechanisms above and below the work operating spindle 27, is the same and will now be described in detail. 37 designates the lower operating quadrant mounted on the shaft or operating post 38, which carries the outlet control valve lever arm 39, which operates the outlet valve 40 composed of the discs 41 and 42 which control the lower left and right hand outlet ports which discharge into the left and right hand branches 43 and 34 respectively of the lower outlet manifold 35. It will be understood that the left hand strainer chamber 12 has at its bottom the outlet branches 44 and 45 as seen in Figure 3, which discharge into the outlet branch 43 see Figure 7 and are similar to the corresponding members 32 and 33 of the right hand strainer chamber 11, seen in Figure 6. The manner of forming the valve chamber and valve seats for the lower control valve 40, is substantially the same as already described with respect to the inlet control valve, and will be understood from Figures 3 and 6. It will consequently be apparent from the foregoing that in our novel construction of strainer, there is provided two separate or independent strainer inlet and outlet members on each side of the apparatus, the passages through which the liquid passes at the right of the apparatus when the left hand side of the device is temporarily inoperative, being numbered 3, 5, 7, 9, 11, 32, 33 and 34 while the corresponding passages at the left of the apparatus are numbered respectively 4, 6, 8, 10, 12, 44, 45 and 43. The left and right-hand inlet ports 6 and 5, respectively, whose location will be understood from Figures 1 and 2, are controlled by the inlet control valve 17, while the bottom outlet ports leading to the branches 43 and 34 of the outlet manifold 35, see Figure 7, are controlled by the lower outlet control valve 40, as will be seen from Figures 5 and 6, and the dotted lines at the lower left hand portion of Figure 1.

It will be apparent that the inlet control valve 17 and the outlet control valve 40 are simultaneously or synchronously operated upon the rotation of the single hand wheel 28 and that when the upper inlet control valve 17 closes the upper left-hand inlet port 6, the exit passage to the lower left-hand outlet 43 will also be closed, as will be understood from Figure 1, the position of the lower valve 40 and its adjuncts being indicated in dotted lines in said figure. Each of the strainer chambers 11 and 12 is constructed substantially the same and is provided with a strainer element or strainer basket 31, both of these being identical and being preferably constructed of wire gauze or perforated sheet metal and each strainer basket 31 is supported from a strainer basket sleeve 46 seen in Figure 3, which is provided with hand grips 47 for enabling the strainer basket to be readily lifted, said baskets being supported by the contact of their sleeves 46 with the annular flange or shoulder 48, seen in Figures 3 and 6.

49 designates a cup-shaped chamber in the upper portion of each strainer chamber, the same being provided with an annular lip or ledge 50 forming a cover plate seat around which is an annular pocket or recess 51, which is provided with a drain pipe 52 having the valve 53 therein. The object of this cup-shaped chamber 49 is to prevent slopping over of the liquid in the strainer when the cover plate 54 is removed and the operator starts to lift a strainer basket 31.

It will readily be seen that if a strainer basket 31 is clogged with sediment, when it is raised up for removal the liquid contents cannot readily escape and the result will be, that as frequently happens with strainers now in use, a large quantity of the liquid slops over and is wasted. With our construction, however, any waste will flow over into the annular recess 51 and thence out the valved drain pipe 52 and can be reclaimed in a bucket placed under the exit end of said pipe 52, so that there is no waste in our device.

The top closure or cover plate 54 has a pocket 55 therein, in which is swivelled a head 56 of the cover plate screw 57, which passes through the yoke 58 which has an open recess 59 in one end thereof and an oppositely disposed open recess 60 in the opposite end as best seen in Figure 2 which recesses respectively engage the studs 61 and 62, which are each provided with a head 63. It will consequently be seen that when a yoke 58 is in engagement with the studs 61 and 62, the rotation of the cover plate screw 57 in the proper direction will tightly clamp the cover plate 54, upon its seat 50. When it is desired to remove either cover plate, it is only necessary to loosen the screw 57 whereupon the yoke 58 can be swung to one side and the screw 57 and cover plate 54 readily removed, thereby giving access to the desired strainer basket. The construction of the cover plate, yoke, coverplate screw and their adjuncts is the same for each strainer chamber 11 and 12 as is evident.

In order to provide a ready means for indicating which side of the apparatus is in use, we employ the rotatable indicator 64, seen in Figures 2, 3, and 8, the same being mounted on the rotatable stem 65 and having a plate 66 with the words " in use" thereon. The lower end of the stem 65 is provided with a lateral finger 67, which passes through a slot 70 in the arm 68, mounted on a rod 69, said rod being actuated by a suitable connection with the upper operating post 23, so that the indicator will be actuated automatically with the rotation of said post and thus indicate which side of the apparatus is in use, as, for example, the right-hand side in Figure 2.

In Figure 8, we have shown one preferred manner of making the above connections, one end 71 of the rod 69 being screwed into the post 23, while the opposite end 72 has its bearing in the casting common to the strainer chambers 11 and 12, but it is obvious that other equivalent means for actuating the rod 69 and its adjuncts may be employed.

The operation is as follows:—

When the upper and lower control valves 17 and 40 are turned to the left in Figure 1 or into the position seen in Figures 1, 2, 3 and 6, it will be apparent that the left-hand side of the apparatus is closed or inoperative and that the liquid to be strained will pass into the right-hand strainer basket, flowing through passages 3, 5, 7 and 9 through the strainer basket and out through the passages 32 and 33 to the outlets 34 and 36 of the outlet manifold, see Figure 7, it being understood that the right-hand side of the apparatus is now in use and is being so indicated by the indicator 64, see Figure 2. The left-hand side of the apparatus is inoperative, and it is obvious that the strainer basket in the strainer chamber 12 is readily accessible for the purpose of cleaning, inspection or repair. If the spindle 27 operating the worm 26 is now rotated in the proper direction, the racks 25 and 37 will be rotated into a position opposite to that seen in Figures 1 and 4, so that the upper and lower control valves 17 and 40 will be in a position opposite to that shown in Figures 1, 2 and 3, whereupon the right-hand side of the apparatus will be inoperative.

The liquid will now flow through passages 4, 6, 8 and 10 into the left-hand strainer chamber 12 and out through the outlets 44 and 45 seen in Figure 3 to the outlet branch 43 and thence to the exit 36, as seen in Figure 7. The strainer in the chamber 11 can now be raised, inspected, cleaned or replaced without disturbing the continuous operation of the device, as is evident.

It will consequently be seen from the foregoing that it is impossible to shut the strainer off completely, since one side or the other must be in service at all times, which is an invaluable feature in marine use, where the strainer is located on the oil line supplying burners under the boilers, which prevents the possibility of a careless operator putting out the fires by closing the strainer valves incorrectly.

The indicator 66 is automatic in its operation, since it moves in unison with the rotation of the post 23, as will be understood from Figure 8, and is a very useful accessory in indicating or determining instantly which side of the apparatus is temporarily inoperative. The employment of a single worm operating spindle 27 effects the instantaneous and synchronous operation of both the control valves 17 and 40, and upon the removal of the contiguous manifold, either of the control valves are readily accessible, each quadrant as 25, its operating post 23, arm 22, and valves discs 18 and 19 rocking in unison.

Having thus described our invention, what we claim as new and desire to secure by Letters Patent, is:—

1. In a strainer, an upper inlet control valve, a lower outlet control valve, conduits controlled by said valves, quadrants having their rack teeth juxtaposed to each other, connections from said quadrants to said valves, whereby the latter and said quadrants operate in unison, a worm common to and in mesh with said quadrants, and means for actuating said worm.

2. In a strainer, an upper and lower valve, conduits controlled thereby, a valve lever for each of said valves, a valve operating post for each of said levers, packing devices for each of said posts, a quadrant for each of said posts, a worm common to and in mesh with said quadrants, a worm spindle carrying said worm and a hand wheel on said spindle for actuating said worm and quadrants simultaneously.

3. In a strainer, an inlet control valve, an outlet control valve, conduits controlled by said valves, each of said valves being composed of a pair of discs having a pocket therein, a spring in said pocket for pressing said valve discs outwardly against their seats, a valve lever for each valve having a portion engaging said valve discs, operating posts upon which said levers are mounted, packing devices for said posts, a quadrant mounted on each of said posts, the teeth of said quadrants being juxtaposed to each other, a worm common to said quadrants, and means for rotating said worm.

4. In a strainer, a plurality of strainer chambers, an upper inlet manifold having a plurality of outlet openings, a Y-branch intermediate said chambers and manifold, a spacing ring intermediate said branch and manifold, thereby forming a plurality of valve chambers, an inlet control valve adapted to oscillate in either direction and control the openings to said branch, a lower outlet manifold, twin connections intermediate said outlet manifold and the lower portion of said strainer chambers, an outlet valve chamber similar to said inlet valve chamber, an outlet control valve for said latter chamber, an operating post for each of said valves, quadrants mounted on said operating posts, and means for actuating said quadrants, posts and valves in unison.

5. In a strainer, a plurality of strainer chambers, an upper inlet manifold having a plurality of outlet openings, a Y-branch intermediate said chambers and manifold, a spacing ring intermediate said branch and manifold, thereby forming a plurality of valve chambers, an inlet control valve adapted to oscillate from right to left and control the openings to said branch, a lower outlet manifold, twin connections intermediate said outlet manifold and the lower portion of said strainer chambers, an outlet valve chamber similar to said inlet valve chamber, an outlet control valve for said latter chamber, an operating post for each of said valves, quadrants mounted on said operating posts, and means for actuating said quadrants, posts and valves in unison, said means comprising a worm common to and engaging said quadrants, a spindle for said worm, and a hand wheel on said spindle.

6. In a strainer, a strainer chamber, oppositely located studs thereon, a yoke having recesses in its ends engaging said studs, a cover plate threaded stem passing through said yoke, a cover plate having the lower end of said stem swivelled therein, a seat in said strainer chamber for said cover plate, an annular recess around said seat, and a drain pipe leading outwardly from said recess.

7. In a strainer, an outlet chamber, an annular raised seat therein, an annular recess exterior to said seat for catching the overflow from a raised strainer basket, and a drain pipe leading exteriorly from said recess.

GEORGE P. HAYNES.
JAMES McDONALD.

Witnesses:
CHARLES GERTISSER,
T. TORGERSEN.